United States Patent
Mannikka et al.

(10) Patent No.: US 8,027,706 B2
(45) Date of Patent: Sep. 27, 2011

(54) METHODS FOR REALIZING AN IN-VEHICLE RINGTONE

(75) Inventors: Matthew R. Mannikka, St. Clair Shores, MI (US); Blain F. Levitt, Waterford, MI (US)

(73) Assignee: General Motors LLC, Detroit, MI (US)

( * ) Notice: Subject to any disclaimer, the term of this patent is extended or adjusted under 35 U.S.C. 154(b) by 712 days.

(21) Appl. No.: 11/440,947

(22) Filed: May 25, 2006

(65) Prior Publication Data

US 2007/0277193 A1    Nov. 29, 2007

(51) Int. Cl.
*H04M 1/00* (2006.01)

(52) U.S. Cl. .......... 455/569.2; 455/569.1; 455/3.01; 455/3.03; 455/3.06

(58) Field of Classification Search .......... 455/569.2, 455/2.01, 3.02, 3.03, 3.06, 414.1, 452.1
See application file for complete search history.

(56) References Cited

U.S. PATENT DOCUMENTS

| | | | |
|---|---|---|---|
| 7,103,391 B2 * | 9/2006 | Chan | 455/567 |
| 7,113,981 B2 * | 9/2006 | Slate | 709/217 |
| 7,256,700 B1 * | 8/2007 | Ruocco et al. | 340/576 |
| 2005/0120858 A1 * | 6/2005 | Fitzgerald et al. | 84/1 |
| 2005/0202385 A1 | 9/2005 | Coward et al. | |
| 2005/0251820 A1 | 11/2005 | Stefanik et al. | |
| 2006/0023576 A1 * | 2/2006 | Takeda | 369/44.11 |
| 2007/0042812 A1 * | 2/2007 | Basir | 455/569.2 |

* cited by examiner

*Primary Examiner* — Kamran Afshar
*Assistant Examiner* — Dung Lam
(74) *Attorney, Agent, or Firm* — Dierker & Associates, P.C.

(57) ABSTRACT

A method of acquiring a preferred ringtone for a telematics unit in a vehicle includes indicating, via a user interface panel in communication with the telematics unit, that an audio emission is related to the preferred ringtone. The audio emission emanates from a vehicle audio system operatively disposed in the vehicle. The method further includes transmitting the preferred ringtone to the vehicle via the telematics unit. The preferred ringtone notifies a user of an incoming communication.

11 Claims, 3 Drawing Sheets

METHODS FOR REALIZING AN IN-VEHICLE RINGTONE

TECHNICAL FIELD

The present disclosure relates generally to vehicles, and more particularly to methods for realizing an in-vehicle ringtone.

BACKGROUND

An increasing number of vehicles include some form of an in-vehicle communication system. An overwhelming majority of these systems include some form of audio notification (i.e., ringtone) of an incoming communication.

Many of these vehicles use a standard, factory-installed ringtone. Generally, no means are provided for altering the ringtone so that it is personal or more preferable to the user.

As such, it would be desirable to provide a method and system for acquiring a preferred in-vehicle ringtone.

SUMMARY

A method of acquiring a preferred ringtone for a telematics unit in a vehicle includes indicating, via a user interface panel in communication with the telematics unit, that an audio emission is related to the preferred ringtone. The audio emission emanates from a vehicle audio system operatively disposed in the vehicle. The method further includes transmitting the preferred ringtone to the vehicle via the telematics unit. The preferred ringtone notifies a user of an incoming communication.

BRIEF DESCRIPTION OF THE DRAWINGS

Objects, features and advantages of embodiments of the present disclosure may become apparent by reference to the following detailed description and drawings, in which.

DETAILED DESCRIPTION OF THE EMBODIMENTS

Embodiments of the method disclosed herein advantageously allow vehicle users to select a desirable ringtone that will alert the user of an incoming communication on their vehicle communication system. The ringtone may correspond with the content of an audio broadcast; as such, the user may request the ringtone upon hearing the audio broadcast. It is believed that this substantially simplifies the requesting process for the user.

It is to be understood that, as defined herein, a user may include vehicle operators and/or passengers.

Further, it is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct communication and indirect communication. As such, indirect communication includes communication between two components with additional component(s) therebetween.

Figure 1:
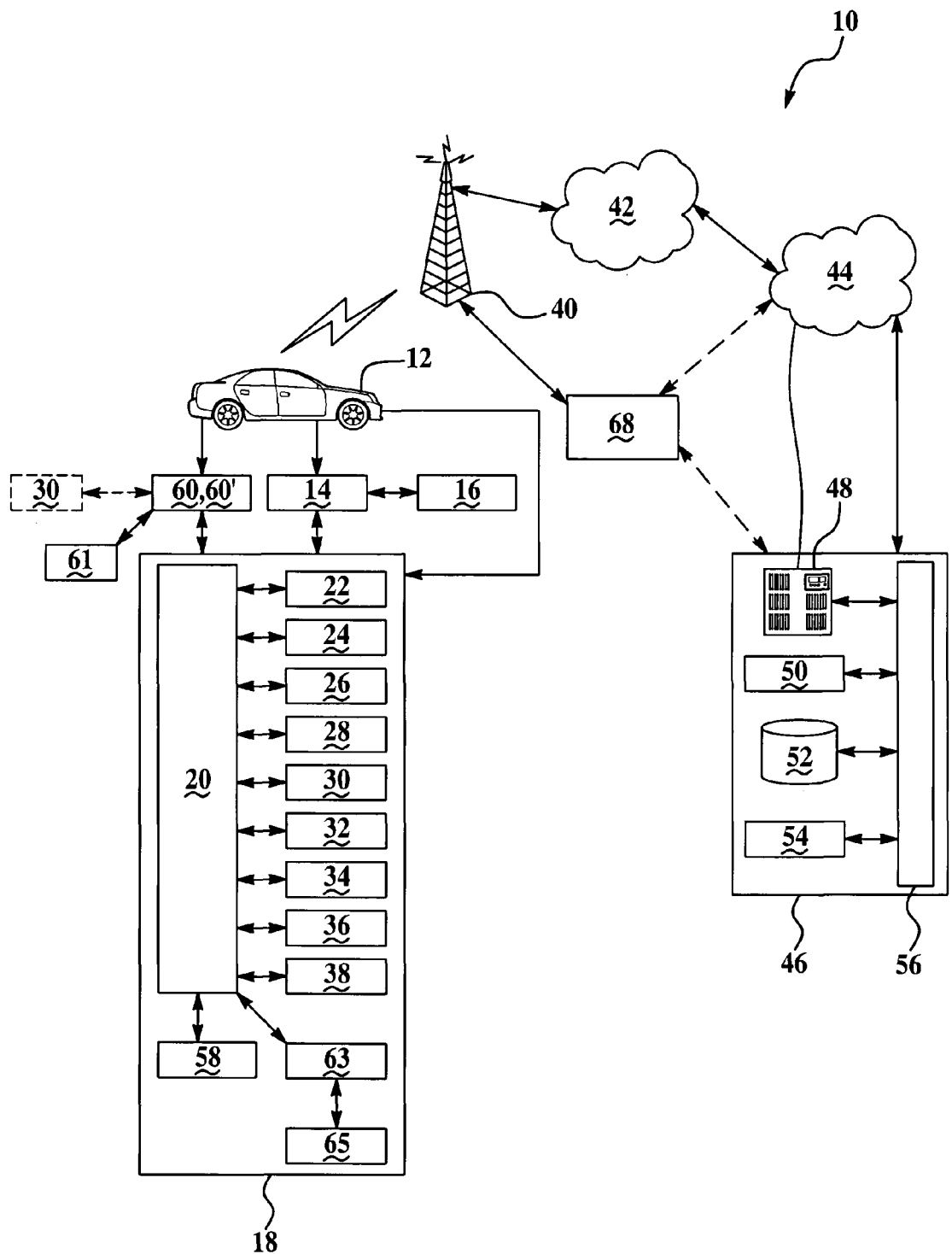
FIG. 1 is a schematic diagram depicting an embodiment of a system for realizing an in-vehicle ringtone.

Referring now to FIG. 1, the system 10 includes a vehicle 12, a vehicle communications network 14, a telematics unit 18, a wireless communication system (including, but not limited to, one or more wireless carrier systems 40, one or more communication networks 42, and/or one or more land networks 44). In an embodiment, the wireless communication system is a two-way radio frequency communication system. In another embodiment, the wireless communication system also includes one or more call centers 46 and/or one or more Internet-enabled programs 68. In yet another embodiment, vehicle 12 is a mobile vehicle with suitable hardware and software for transmitting and receiving voice and data communications. System 10 may include additional components suitable for use in telematics units 18.

In an embodiment, via vehicle communications network 14, the vehicle 12 sends signals from the telematics unit 18 to various units of equipment and systems 16 within the vehicle 12 to perform various functions, such as unlocking a door, executing personal comfort settings, and/or the like. In facilitating interaction among the various communications and electronic modules, vehicle communications network 14 utilizes interfaces such as controller area network (CAN), ISO standard 11989 for high speed applications, ISO standard 11519 for lower speed applications, and Society of Automotive Engineers (SAE) standard J1850 for high speed and lower speed applications.

The telematics unit 18 may send and receive radio transmissions from wireless carrier system 40. In an embodiment, wireless carrier system 40 may be a cellular telephone system and/or any other suitable system for transmitting signals between the vehicle 12 and communications network 42. Further, the wireless carrier system 40 may include a cellular communication transceiver, a satellite communications transceiver, a wireless computer network transceiver (a non-limitative example of which includes a Wide Area Network (WAN) transceiver), and/or combinations thereof.

Telematics unit 18 may include a processor 20 operatively coupled to a wireless modem 22, a location detection system 24 (a non-limitative example of which is a global positioning system (GPS)), an in-vehicle memory 26, a microphone 28, one or more speakers 30, an embedded or in-vehicle mobile phone or TTY compatible mobile phone 32, a short-range wireless communication network 38 (e.g. a Bluetooth® unit), a user interface 63, a user interface panel 65, and/or a ringtone module 36.

It is to be understood that the telematics unit 18 may be implemented without one or more of the above listed components, such as, for example, speakers 30. Additionally, it is to be understood that the speaker(s) 30 may be a component of the vehicle audio system 60 (which includes a receiver 60'), which may, in addition to radio broadcasts, accept audio and other signals from the telematics unit 18. Telematics unit 18 may include additional components and functionality as desired for a particular end use.

Processor 20 may be a micro controller, a controller, a microprocessor, a host processor, and/or a vehicle communications processor. In another embodiment, processor 20 may be an application specific integrated circuit (ASIC). Alternatively, processor 20 may be a processor working in conjunction with a central processing unit (CPU) performing the function of a general-purpose processor.

Non-limitative examples of the location detection system 24 include a Global Position Satellite receiver, a radio triangulation system, a dead reckoning position system, and/or combinations thereof. In particular, a GPS provides accurate time and latitude and longitude coordinates of the vehicle 12 responsive to a GPS broadcast signal received from a GPS satellite constellation (not shown). In-vehicle mobile phone 32 may be a cellular type phone, such as, for example an analog, digital, dual-mode, dual-band, multi-mode and/or multi-band cellular phone.

Associated with processor 20 is a real time clock (RTC) 34 providing accurate date and time information to the telematics unit hardware and software components that may require date and time information. In one embodiment, date and time information may be requested from the RTC 34 by other telematics unit components. In other embodiments, the RTC 34 may provide date and time information periodically, such as, for example, every ten milliseconds.

Processor 20 may execute various computer programs that interact with operational modes of electronic and mechanical systems within the vehicle 12. It is to be understood that processor 20 controls communication (e.g. call signals) between telematics unit 18, wireless carrier system 40, call center 46, and Internet-enabled program 68.

Further, processor 20 may generate and accept digital signals transmitted between the telematics unit 18 and the vehicle communication network 14, which is connected to various electronic modules in the vehicle 12. In one embodiment, these digital signals activate the programming mode and operation modes within the electronic modules, as well as provide for data transfer between the electronic modules. In another embodiment, certain signals from processor 20 may be translated into vibrations and/or visual alarms.

It is to be understood that software 58 may be associated with processor 20 for monitoring and/or recording the incoming caller utterances.

The communications network 42 may include services from one or more mobile telephone switching offices and/or wireless networks. Communications network 42 connects wireless carrier system 40 to land network 44. Communications network 42 may be any suitable system or collection of systems for connecting the wireless carrier system 40 to the vehicle 12 and the land network 44.

The land network 44 connects the communications network 40 to the call center 46 and/or to the Internet-enabled program 68. In one embodiment, land network 44 is a public switched telephone network (PSTN). In another embodiment, land network 44 is an Internet Protocol (IP) network. In still other embodiments, land network 44 is a wired network, an optical network, a fiber network, another wireless network, and/or any combinations thereof. The land network 44 may be connected to one or more landline telephones. It is to be understood that the communications network 42 and the land network 44 connect the wireless carrier system 40 to the call center 46 and/or the Internet-enabled program 68.

Call center 46 contains one or more data switches 48, one or more communication services managers 50, one or more communication services databases 52 containing subscriber profile records and/or subscriber information, one or more communication services advisors 54, and one or more network systems 56.

Switch 48 of call center 46 connects to land network 44. Switch 48 transmits voice or data transmissions from call center 46, and receives voice or data transmissions from telematics unit 18 in vehicle 12 through wireless carrier system 40, communications network 42, and land network 44. Switch 48 receives data transmissions from, or sends data transmissions to one or more communication service managers 50 via one or more network systems 56.

Call center 46 may contain one or more service advisors 54. In one embodiment, service advisor 54 may be human. In another embodiment, service advisor 54 may be an automaton.

Verbal communication may take place via microphone 28 coupled to the in-vehicle or mobile phone 32 associated with the telematics unit 18. Caller utterances into the microphone 28 are received at the call center 46, which tokenizes the utterance stream for further processing. In one embodiment, the tokenized utterances are placed in a subscriber information database 52 at the call center 46.

Figure 2:
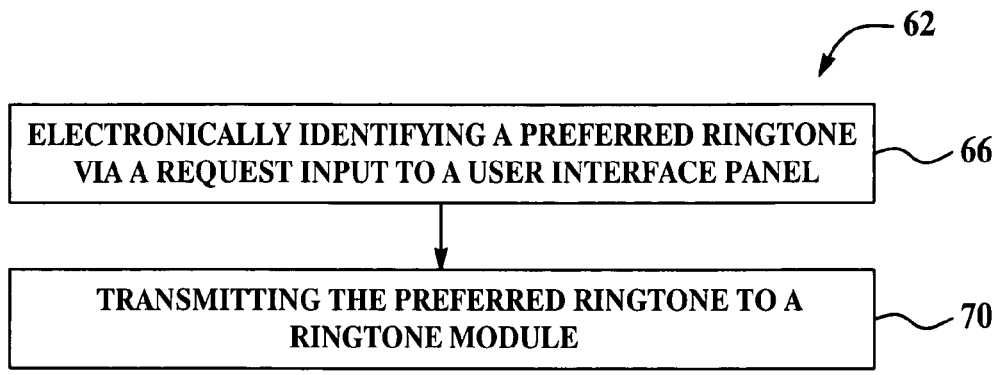
FIG. 2 is a flow diagram depicting an embodiment of a method for realizing a preferred in-vehicle ringtone adapted to notify a user of an incoming communication.

Referring now to FIG. 2, an embodiment of a method 62 for realizing an in-vehicle ringtone adapted to notify a user of an incoming communication is depicted. It is to be understood that a communication may include an incoming phone call. In an alternate embodiment, the communication may include data downloaded to the vehicle 12 via packet data, e.g. text message(s), SMS (Short Message Service) message(s), or the like, or combinations thereof. As non-limitative examples, the data may be a set of navigation instructions, e-mail, or the like. It is to be understood that, in an embodiment, a different ringtone may optionally be associated with each different type of data and with an incoming verbal phone call (or one ringtone for any type of data, and a different ringtone for a verbal phone call), so as to audibly distinguish between various incoming communications.

The method 62 of FIG. 2 includes electronically identifying a preferred ringtone via a request input to a user interface panel 65 operatively connected to a user interface 63, as depicted at 66. The user interface 63 recognizes the request and transmits a signal that corresponds with the request to the telematics unit 18 operatively disposed in the vehicle 12. The method further includes transmitting the preferred ringtone to the ringtone module 36, as depicted at reference numeral 70.

It is to be understood that the request may be input to the user interface panel 65 via any suitable means. As non-limitative examples, the request may be input via a button, a switch, a keyboard, a microphone, and/or combinations thereof.

The preferred ringtone may be transmitted to the vehicle 12 from any suitable place such as, for example, a service provider and/or a media provider. As a non-limitative example, a satellite radio system may be a service provider and/or a media provider. Additionally, the call center 46 is a non-limitative example of a service provider, and an Internet-based audio provider (e.g. streaming audio) is a non-limitative example of a media provider.

It is to be understood that the ringtone module 36 is located in the vehicle 12 and is in communication with the telematics unit 18. In an embodiment, the ringtone module 36 is adapted to store and/or play one or more ringtones. As such, an embodiment of a ringtone module 36 may store and/or play two or more ringtones, and may also play different ringtones at different times. As a non-limitative example, the ringtone module 36 plays a predetermined ringtone to indicate an incoming call from a particular phone (or calling device), whereby the caller may be effectively identified.

Generally, in the embodiments disclosed herein, the preferred ringtone is related to an audio emission from a vehicle audio system 60. It is to be understood that an audio emission may include any audio output such as, for example, a song, talk radio, advertisements, news, weather, and/or the like. The audio emission is electronically identified as the preferred ringtone via the request inputted by the user. Generally, the user hears the audio emission and inputs his/her request for the ringtone substantially simultaneously with the audio emission. In a non-limitative example, a user inputs the request to the user interface panel 65 at approximately the same time that the preferred ringtone is playing over the vehicle audio system 60. It is to be understood, however, that the request may be input slightly before (at any time period before, an example of which is from about 2 seconds to about 30 minutes before) the preferred ringtone is emitted from the vehicle audio system 60. A non-limitative example of this is when a song (that the user desires to have as a ringtone) is announced by a DJ but has not yet begun to play. It is to be further understood that the request may also be input for a period of time after the audio emission is played. It is to be understood that the period of time may be any suitable time period. In an embodiment, the time period may range from about 2 seconds to about 30 minutes.

In an embodiment, a user may view (which may include requesting) all or some of the vehicle audio emissions from a predetermined time period, wherein the preferred ringtone may be selected therefrom. As non-limitative examples, a user may request and/or be provided with all or some of the audio emissions from his/her vehicle audio system 60 from the previous 30 minutes, and/or all or some of the audio emissions played on, e.g., station "WABC" in the previous 45 minutes.

It is to be understood that the preferred ringtone may include a sample of the audio emission or the entire audio emission. As such, the preferred ringtone may include any predetermined portion of an audio emission. Further, it is to be understood that the preferred ringtone may also be an alternate version of the audio emission. As such, the preferred ringtone may not be identical to the audio emission. In a non-limitative example, the preferred ringtone may be in a MIDI (Musical Instrument Digital Interface) audio file format.

In embodiment(s) disclosed herein, the user interface 63 may be any device or system that is capable of receiving and recognizing the user's request, and that is capable of transmitting a signal that corresponds with the request to the telematics unit 18. The user interface 63, in response to the request, acquires and/or downloads the in-vehicle ringtone. Embodiments of a user interface 63 include an Internet-enabled program or a voice actuated program. With a voice actuated program, a user may speak in any stage of interaction, such as, for example, to initiate a request, to navigate menus, to select a preferred ringtone, and/or to terminate a request.

In an embodiment, electronically identifying a preferred ringtone, includes the user requesting a desired ringtone, and the user interface 63 assessing the availability of the desired requested ringtone. In the event that the requested ringtone is available, the user interface 63 selects the preferred ringtone and transmits it to the vehicle 12 so that it becomes the in-vehicle ringtone. In the event that the desired ringtone is not available, then one or more ringtones are presented to the user, and the user may then select the preferred ringtone from the one or more presented ringtones. It is to be understood that the one or more ringtones may be related to the desired ringtone. As used herein, "related" refers to two or more ringtones and/or audio emissions having a common feature such as, for example, a common title, composer, performer, genre, producer, recording label, and/or the like, and/or combinations thereof.

In another embodiment, electronically identifying the preferred ringtone includes identifying an audio emission title and/or an audio emission artist. It is to be understood that an audio emission title may include any suitable graphical indicia, alphanumeric indicia, or combination thereof that indicates an audio emission title, including a partial audio emission title, a keyword of an audio emission title, or a complete audio emission title. Likewise, an audio emission artist may include any suitable graphical indicia, alphanumeric indicia, or combination thereof that indicates an audio emission artist (i.e. performer and/or composer), including a partially indicated audio emission artist, a keyword of an audio emission artist, or a completely indicated audio emission artist.

In yet another embodiment, electronically identifying the preferred ringtone includes requesting a desired ringtone; analyzing a catalog of ringtones for a related alternative ringtone; assessing the availability of the desired ringtone and/or the related alternative ringtone; compiling a list of available ringtones; and selecting (generally, the user makes the selection) the preferred ringtone from the list of available ringtones. The list of available ringtones may include any combination of ringtones available for acquiring/downloading. As such, the list of available ringtones may include the desired ringtone and/or one or more related alternative ringtones. It is contemplated, however, that the occasion may arise in which no list may be generated, as neither the desired ringtone nor related alternative ringtones is available.

The catalog of ringtones is a database that includes the available ringtones. The catalog may be accessible to the user interface 63 that assesses the availability of the requested ringtone. It is to be understood that the catalog of ringtones may be located at the call center 46, on the Internet, in the vehicle 12, at any other suitable location, and/or any combination thereof. Further, it is to be understood that the catalog of ringtones may be embodied in any suitable form. In an embodiment, the catalog of ringtones is in electronic form, and in another embodiment, it is in physical form.

The embodiments of electronically identifying the preferred ringtone may also include interfacing the telematics unit 18 with a satellite receiver, radio data services, or combinations thereof. As such, information may be transferred to and/or from the telematics unit 18 (and, thus, the vehicle 12) via the satellite receiver, radio data services, or combinations thereof. In an embodiment, the preferred ringtone may be transferred to the telematics unit 18 via the satellite receiver.

Figure 3:
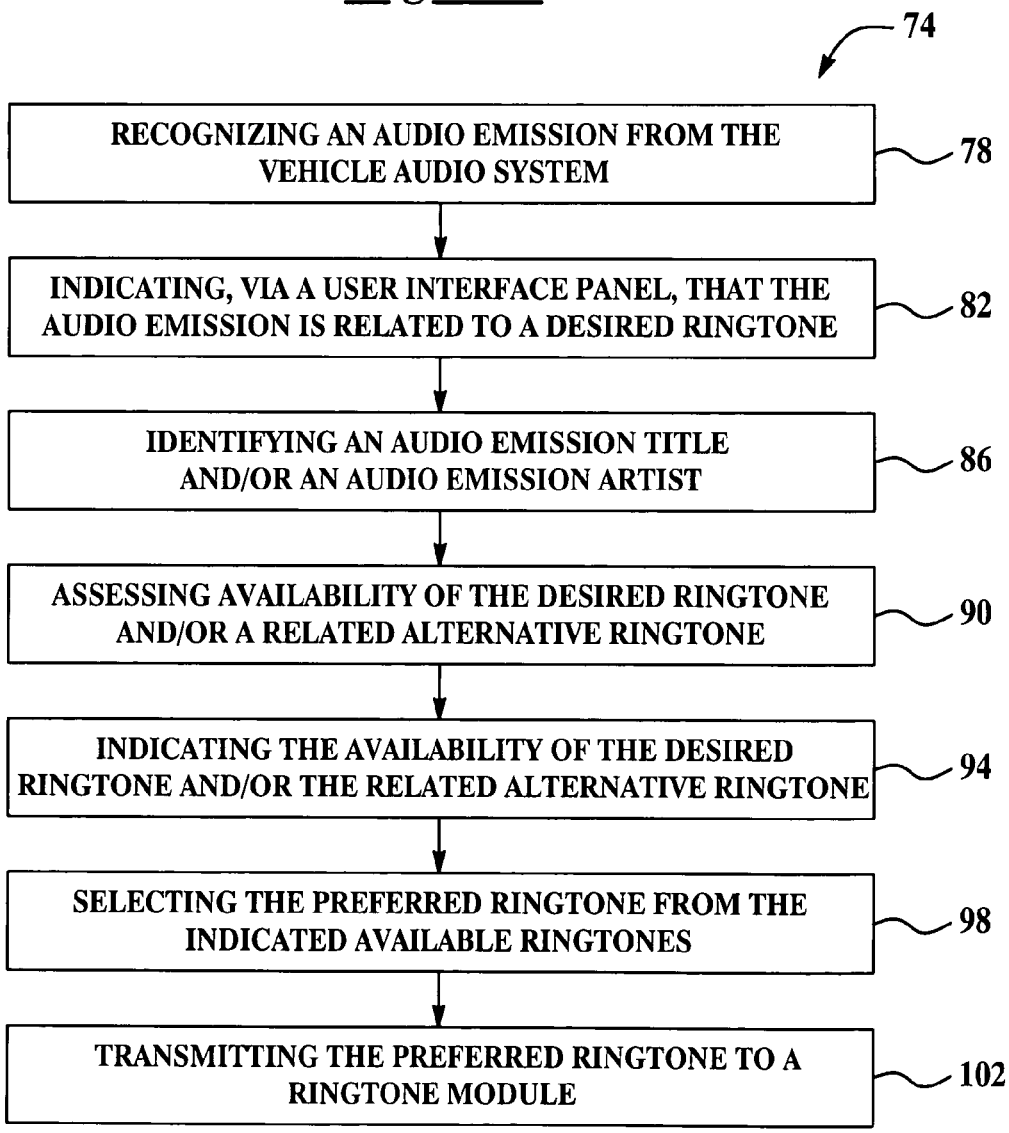
FIG. 3 is a flow diagram depicting an embodiment of a method for selecting an in-vehicle ringtone adapted to notify a user of an incoming communication.

Referring now to FIG. 3, an embodiment of a method 74 of acquiring a preferred in-vehicle ringtone adapted to notify a user of an incoming communication in a vehicle 12 having a vehicle audio system 60 is depicted. The method 74 may include recognizing an audio emission from the vehicle audio system 60, as depicted at reference numeral 78; indicating, via a user interface panel 65 in communication with a telematics unit 18, that the audio emission is related to a desired ringtone, as depicted at reference numeral 82; and identifying an audio emission title and/or an audio emission artist of the desired ringtone, as depicted at reference numeral 86. The method 74 may also include assessing the availability of the desired ringtone or a related alternative ringtone, as depicted at reference numeral 90; indicating to the user the availability of the desired ringtone or the related alternative ringtone, as depicted at reference numeral 94; selecting the preferred ringtone from the indicated available ringtones, as depicted at reference numeral 98; and transmitting the preferred ringtone from a service provider 46 to the vehicle 12 via the telematics unit 18, as depicted at reference numeral 102.

In an embodiment, identifying at least one of the audio emission title or audio emission artist, includes interfacing the telematics unit 18 with one or more satellite receivers, radio data services, or combinations thereof, as described hereinabove. Additionally, transmitting the preferred ringtone may be accomplished by the satellite receiver(s) transmitting, to the telematics unit 18, the preferred ringtone relating to the audio emission title and/or the audio emission artist.

It is to be understood that assessing availability may include comparing the desired ringtone and/or the related ringtone with the catalog of ringtones. Thus, it is contemplated that any of the desired ringtone(s) and/or the related ringtone(s) that is/are found in the catalog of ringtones is/are considered to be "available."

Figure 4:
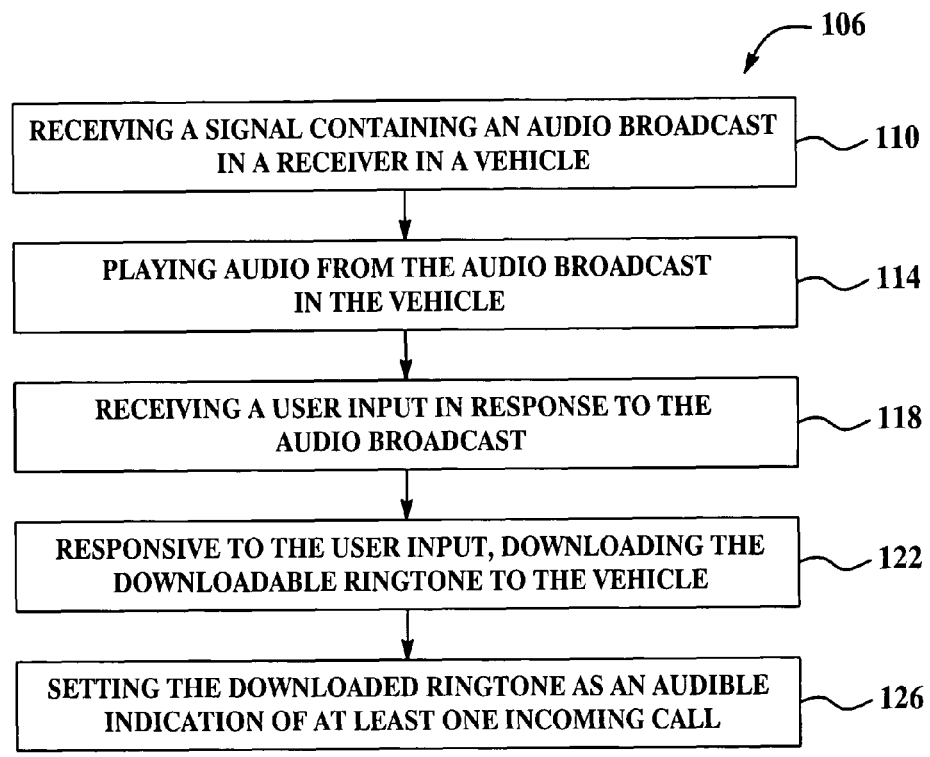
FIG. 4 is a flow diagram depicting another embodiment of a method for selecting an in-vehicle ringtone adapted to notify a user of an incoming communication.

Referring now to FIG. 4, an embodiment of a method 106 of selecting a ringtone for an in-vehicle telematics unit 18 is depicted. The method 106 may include receiving a signal containing an audio broadcast in a receiver in a vehicle 12, as depicted at reference numeral 110; wherein the signal includes at least one datum indicating an available downloadable ringtone corresponding to content of the audio broadcast. The method may also include playing audio from the audio broadcast in the vehicle 12, as depicted at reference numeral 114; receiving, via the telematics unit, a user input in response to the audio broadcast, as depicted at reference numeral 118; downloading the downloadable ringtone to the vehicle 12, as depicted at reference numeral 122; and setting the downloaded ringtone as an audible indication of at least one incoming call, as depicted at reference numeral 126. In an embodiment, downloading the downloadable ringtone is performed in response to the user input.

As previously described, the user may hear the audio broadcast over the vehicle audio system 60, and in response, may input a request that the content of the broadcast be set as the ringtone. The user interface 63 may check the availability of the ringtone and then download the ringtone to the telematics unit 18, which may store, set, and/or transfer the ringtone to the ringtone module 36.

Figure 5:
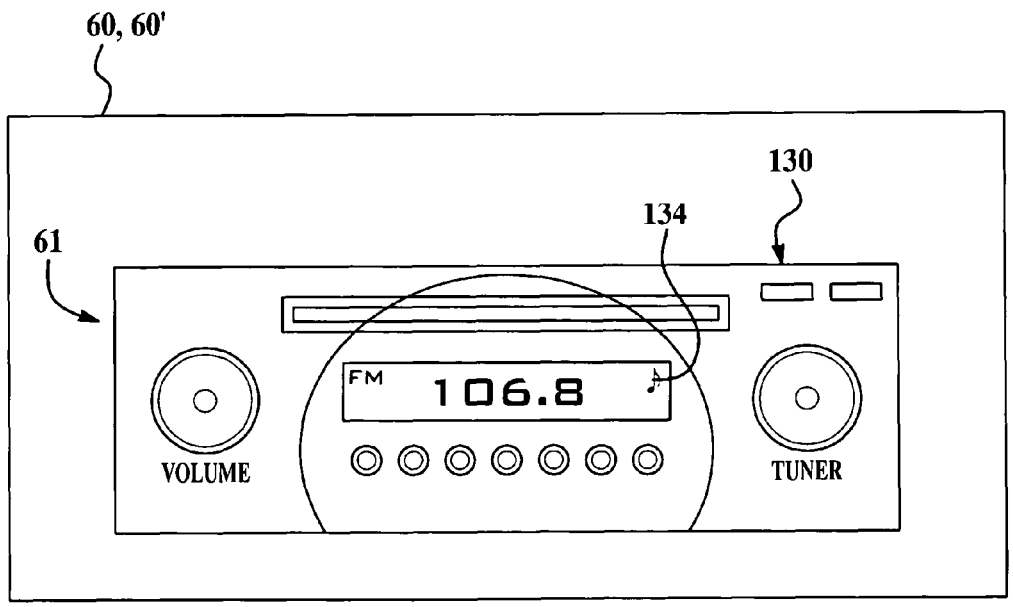
FIG. 5 is a semi-schematic diagram depicting an embodiment of a vehicle audio system and notification system.

Referring now to FIG. 5, an embodiment of a notification system 61 is shown. In this embodiment, notification is accomplished by a display 130 of a vehicle audio system 60 (shown schematically). It is to be understood that any of the previously described methods 62, 74, 106 may further include providing notice, via the vehicle audio system display 130 and/or the user interface panel 65, indicating the availability of a ringtone related to an audio emission. As such, the vehicle audio system display 130 and/or the user interface panel 65 may feature a visual notification that indicates to the user whether a ringtone related to the current audio emission or the requested audio emission is available. A visual notification may include any suitable means of relaying information to a user (e.g., a digital display).

As a non-limitative example, a vehicle audio system display 130 is in communication with the vehicle audio system 60 and acts as the user interface panel 65. The display 130 may flash or otherwise show an icon 134 to indicate the availability of a downloadable ringtone related to the then-current audio emission (e.g., song). Alternately, the display 130 may flash/show another icon 134 (e.g., "N/A") or no icon to indicate that the then-current audio emission is unavailable as a downloadable ringtone. It is to be understood that an icon 134 may be of any suitable design, alphanumeric indicia, and/or graphical indicia.

In an embodiment in which the icon 134 is displayed as the audio emission is playing, it is contemplated that analyzing/assessing the availability of a related alternate ringtone may be unnecessary. In this embodiment, a user may be aware of availability of a ringtone as the audio emission is played and before an electronic request is made.

It is to be further understood that, in addition to, or instead of icon 134, availability of an audio emission as a downloadable ringtone may be indicated by any suitable other visual signaling devices, tactile signaling devices, audio signaling devices, and/or combinations thereof.

Embodiment(s) of a system 10 for selecting a ringtone for the in-vehicle telematics unit 18 may include a receiver 60' operatively disposed in the vehicle 12. The receiver 60' is configured to receive a signal containing an audio broadcast. A notification system 61 (a non-limitative example of which includes icon 134 on display 130 (as described above)), is operatively connected to the receiver 60'. The notification system 61 is configured to indicate an available downloadable ringtone for the telematics unit 18, where the available downloadable ringtone corresponds to content of the audio broadcast.

The system 10 further includes an input system (one non-limitative example of which is user interface panel 65 in conjunction with user interface 63) is configured to receive indication from a user of selection of the available downloadable ringtone. The input system is also configured to cause transmission of a signal corresponding to the user's selection via the two-way radio frequency communication system (discussed above) to a service provider (one non-limitative example of which is the call center 46). The telematics unit 18 is configured to receive from the service provider the available downloadable ringtone and to set the received ringtone as an audible indication of at least one incoming call.

While several embodiments have been described in detail, it will be apparent to those skilled in the art that the disclosed embodiments may be modified. Therefore, the foregoing description is to be considered exemplary rather than limiting.

The invention claimed is:

1. A system for selecting a ringtone for an in-vehicle telematics unit, the system comprising:
   a signal including content of an audio broadcast and at least one datum including electronic data indicating that a downloadable ringtone corresponding to the content of the audio broadcast is available;
   a receiver operatively disposed in the vehicle, the receiver configured to receive the signal;
   an in-vehicle device configured to recognize the datum and the availability of the downloadable ringtone;
   a service provider configured to receive an other signal i) in response to a user input requesting the downloadable ringtone and ii) received in the vehicle within a predetermined time period of the receiver receiving the signal;
   the telematics unit configured to receive the downloadable ringtone from the service provider and to set the received ringtone as an audible indication of at least one incoming call; and
   a two-way radio frequency communication system in communication with the telematics unit and the service provider.

2. A method of acquiring a preferred ringtone for a telematics unit in a vehicle, the method comprising:

presenting a list of vehicle audio emissions from a predetermined time period;
inputting a request that a ringtone corresponding with one of the vehicle audio emissions on the list becomes the preferred ringtone;
assessing availability of the requested ringtone and other ringtone that is related to the requested ringtone;
recognizing that the requested ringtone is not available;
then indicating, via a user interface panel in communication with the telematics unit and a user interface, that the other ringtone is available and is related to the requested ringtone;
selecting the other ringtone; and
transmitting the selected other ringtone as the preferred ringtone to the vehicle via the telematics unit, the preferred ringtone adapted to notify a user of an incoming communication.

3. A method of selecting a ringtone for an in-vehicle telematics unit, comprising:
receiving a signal containing an audio broadcast in a receiver in a vehicle, wherein the signal includes content of the audio broadcast and at least one datum including electronic data indicating that a downloadable ringtone corresponding to the content of the audio broadcast is available;
playing audio from the audio broadcast in the vehicle;
receiving, via the telematics unit, a user input in response to the audio broadcast;
responsive to the user input, recognizing, via an in-vehicle device, the datum and the availability of the downloadable ringtone;
sending a signal, from the in-vehicle device to a remote device, requesting the downloadable ringtone;
downloading the downloadable ringtone to the vehicle; and
setting the downloaded ringtone as an audible indication of at least one incoming call.

4. The method of claim 3 wherein the user input is received simultaneously with the audio broadcast.

5. The method of claim 3 wherein the content of the audio broadcast is selected from a song, talk radio, advertisement, news, and weather.

6. The method of claim 3 wherein the user input is input via at least one of a button, a switch, a keyboard, a microphone, or combinations thereof of a user interface panel in communication with the telematics unit.

7. The method of claim 3 wherein the user input includes identifying at least one of a title of the content or an artist of the content.

8. The method of claim 3, further comprising transmitting to the telematics unit at least one of an audio emission title or an audio emission artist relating to the downloaded ringtone.

9. The method of claim 3 wherein the downloadable ringtone is downloaded to the vehicle from a service provider.

10. The method of claim 3 wherein the downloadable ringtone is downloaded to the vehicle from a media provider.

11. The method of claim 3 wherein the user input is received within a predetermined time period of the receiving of the signal containing the audio broadcast, and wherein the predetermined time period ranges from 2 seconds to about 30 minutes approximately.

* * * * *